Nov. 17, 1936.   E. E. DUNGAN   2,061,189
WEATHER VANE
Filed March 9, 1935
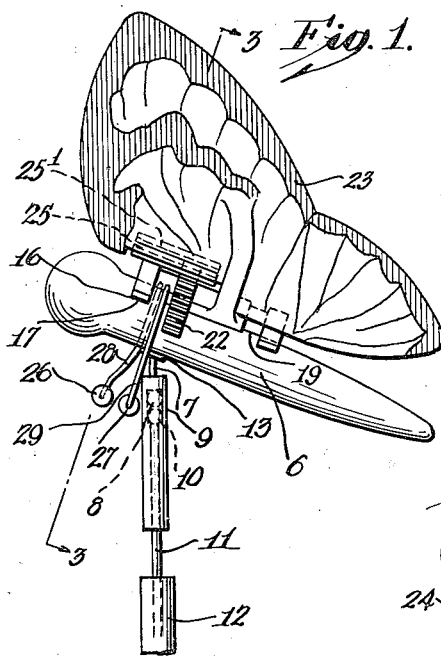
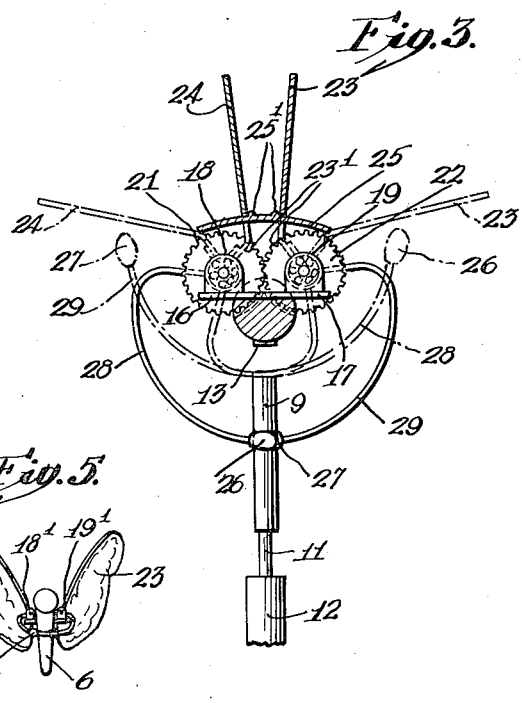
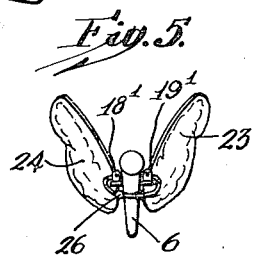
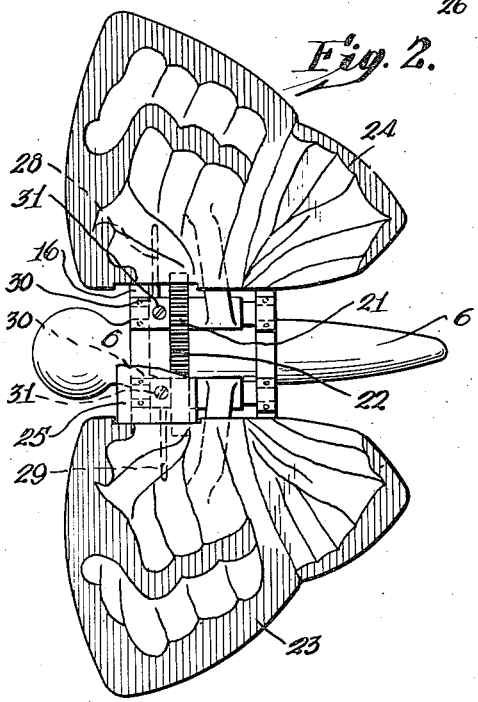
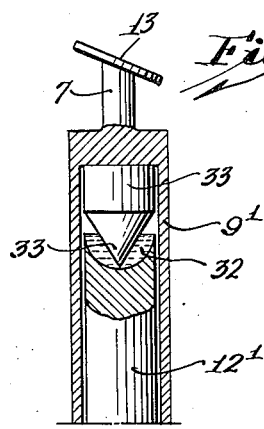

Patented Nov. 17, 1936

2,061,189

UNITED STATES PATENT OFFICE 2,061,189

WEATHER VANE

Elmer E. Dungan, deceased, late of Fort Washington, Pa., by Allan L. Dungan executor, Fort Washington, Pa.

Application March 9, 1935, Serial No. 10,308

1 Claim. (Cl. 73—55)

The invention relates to weather vanes.

The purpose of the invention is to provide a vane which not only indicates the direction of the wind but also approximately the strength of the wind and which is pleasing in appearance.

A further purpose is to provide duplicate wings for a weather vane which shall operate together under the stress of wind pressure.

A further purpose is to mount a weather vane body on a vertical pivot, placing the center line of the body diagonal to the vertical, and to pivot wings on the body in the plane of the center line of the body.

Further purposes will appear in the specification and in the claim.

An effort has been made to produce a useful movable vane which shall also be symmetrical and beautiful, and which shall accentuate the symmetry and beauty by motion under the action of wind pressure.

For this purpose an imitation of a butterfly has been provided on a large scale with mechanisms by which the butterfly is caused to point in the wind direction and the wings of the butterfly symmetrically lift and lower with variation in the wind pressure.

Figure 1 is a side elevation of the butterfly with wings raised.

Figure 2 is a top plan view of the butterfly with wings extended and a cover plate partly broken away.

Figure 3 is a section upon the line 3—3 of the structure seen in Figure 1.

Figure 4 is an enlarged sectional view showing a modified support.

Figure 5 is a front elevation to reduced scale showing a slightly modified form.

In the drawing similar numerals indicate like parts.

The body 6 is supported by a pin 7 terminated in a ball 8 and secured to a protective guide sleeve 9. Within the sleeve the ball 8 rests upon a ball 10 supported by a rod 11 from any suitable standard 12.

The pin 7 is connected with the body in any suitable manner as by a diagonal plate 13 connected with the body near the front of the body so that the tail and the wings will trail toward the wind in the vertical plane of the butterfly body.

At any suitable point upon the body a frame 16 is mounted, having a base 17 and carrying wing-supporting shafts 18, 19. The shafts are shown as parallel to the body axis and to each other in Figure 3 and horizontal but not quite parallel at 18', 19' in Figure 5. There is no necessity for this parallelism, although it secures the most lifelike movement. Different effects can be obtained in the movement of the wings by changes in the relations of these shafts toward each other to vary slightly from parallelism with each other or the body and with the axis.

It will be noted that the wind will lift the wings and permit them to lower with approximate uniformity even without interconnection between them to maintain their relative positions but that the realistic imitation of the butterfly is accentuated by gearing them together so that they register positively. For this reason the shafts carry interconnected gears 21 and 22 which will engage to sufficient depth and with sufficient accuracy even where the shafts are not exactly parallel.

Either to the shafts or to the gearing as preferred are mounted the wings 23, 24, adapted to imitate any bird or insect, most desirably imitating the butterfly. The wings are mounted upon brackets which preferably arch slightly as at 23' in order that, in a high wind when the wings are nearly vertical, they may lie close together as shown in full lines in Figure 3.

The shaft bearings and gearing are protected from the weather by a cover 25 which, however, preferably does not interfere with movement of the wings.

The wings are preferably of any light material such as duralumin (although stainless steel may be used) and are nearly counter-balanced by weights 26 and 27 upon arms 28, 29. At any desired lower wing limit the counter-weights or arms or wings preferably engage with a stop, here the arms 28 and 29 with the body of the butterfly, to hold the wings in a natural lower position, such as that dotted upon Figure 3. The upper limit also may be controlled by a stop, for example suitable upturned ridges 25' on the cover 25. The counter-balance arms are connected with the shafts through collars 30 which are set in adjusted positions by set screws 31 and which may be shifted to vary the counter-balancing effect of the weights or the positions of the wings at which the arms act as stops against the body.

Figure 4 shows an alternative form of thrust bearing in which the support 12' carries a hollow bearing cup 32 which is surrounded by sleeve 9' swinging with the body and with pin 7.

Within the sleeve 9' is removably located a bearing member 33 rigid with sleeve 9'. It terminates in a pointed end. A conical bearing cup is filled with oil and the bearing is well protected from the weather, just as in the case of the other bearing.

In operation, the pressure of the wind turns the entire butterfly to a position generally in line with the wind. As the wings are slightly under counter-balanced they normally rest in some such position as the lower dotted position in Figure 3, but are raised by a normal wind to any upper position such, for example, as that shown in full lines in Figure 3, moving up and down with wind variations and giving a very realistic appearance of a gigantic butterfly hovering over the support. In a violent storm they lift substantially to vertical position unless restrained, and offer very little wind resistance in their upper position, so that there is small chance that a wing will be blown off.

It will be evident that the fixed vertical pivot of the weather vane of this invention is at substantially the center of the object with respect to the effective wind pressure, so that the object is free to rotate in any desired direction and to orient itself with respect to the prevailing wind. The wings normally extend laterally on either side of the pivotal axis and stops prevent lowering movement of the wings below their laterally extending position.

The center line or axis of the body is diagonal to the vertical axis of rotation of the weather vane, and the wings are pivoted substantially in the plane of the axis of the body. This makes possible engagement of the wings with the wind pressure.

The geared interconnection of the wings assures simultaneous upward and downward movement of both wings.

It has been noted that the wings are under counter-weighted so that the wings when at rest will remain in the laterally extending position. A further important feature of the invention is that the resistance to upward movement of the wings increases as the wings move upward, so that a higher wind pressure is required to raise the wings to a higher position. This will be evident when it is understood that, while the centers of mass of the wings approach more closely to the vertical lines through the wing pivots as the wings move upward, and therefore the torque exerted by the wings on the shaft 18 and 19 decreases as the wings rise, the centers of mass of the counter-weights likewise move closer to the vertical lines through the counter-weight pivots as the wings move up and decrease the counter-weighting. Furthermore, the decrease in the counter-weighting is desirably more rapid than the decrease in the torque exerted by the wings, due to the fact that, in the limiting upward position of the wings, the centers of mass of the counter-weights are very close to the vertical lines through the wing pivots, or due to the fact that, by proper adjustment of the counter-weights, before the wings reach their limiting upward positions, the counter-weight centers of mass pass across the vertical lines through the wing pivots to the sides of said vertical lines on which the counter-weights act to urge lowering of the wings. Thus the resistance of the wings to further rise increases as the wings rise.

Thus it will be evident that the wings offer increased resistance to movement of the wings upon increased wind velocity, and that the resistance of the wings increases progressively as the wings rise. A slight change in wind velocity therefore produces a flapping of the wings which closely simulates the fluttering of the wings of a butterfly.

The adjustment of the counter-weighting permits ready selection of the proper counter-weighting for the prevailing wind velocity. For example, a weather vane located in a valley would require less counter-weighting than a weather vane located on a hill which was subjected to variant winds and required greater resistance to wing movement. Furthermore, adjustment of the counter-weighting permits change in the rate of increase of the resistance with movement of the wings, as it adjusts the proximity of the centers of mass of the counter-weights to the vertical lines through the counterweight (and wing) pivots and the positions of the wings at which (if at all) the counter-weights oppose rather than aid wind lifting. The increase of resistance cuts down shocks on the wings when the wind increases.

In view of the invention and disclosure variations and modifications to meet individual whim or particular need will doubtless become evident to others skilled in the art to obtain all or part of the benefits of the invention without copying the structure shown and it is proposed to claim all such in so far as they fall within the reasonable spirit and scope of the invention.

Having thus described the invention, what it is desired to claim as new is:—

A weather vane in the form of a butterfly having a body pivoted upon a fixed approximately vertical axis to turn in the wind and having its longitudinal center line diagonal with respect to the pivotal axis, laterally extending wings hinged to the body moving in upper as distinguished from lower quadrants and diagonal with respect to the vertical axis, interconnected gears attached to the wings and movable with the wings causing them to rise and fall together and by reason of the diagonal position of the wings adapting the wings to rise and fall due to the velocity of the wind and counterweights adapted to swing outwardly and upwardly as the wings fall.

ALLAN L. DUNGAN,
Executor of the Estate of Elmer E. Dungan, Deceased.